(12) United States Patent
Baratz et al.

(10) Patent No.: US 7,171,227 B2
(45) Date of Patent: Jan. 30, 2007

(54) METHOD AND SYSTEM OF INCREASING TRAFFIC IN A TELECOMMUNICATIONS NETWORK

(75) Inventors: Yaron Baratz, Hertzlia (IL); Noah Yitzhak, Moshav Neve Mivtach (IL); Dror Fixler, Gany-Tikva (IL)

(73) Assignee: Septier Communication Ltd., Petach Tikua (IL)

( * ) Notice: Subject to any disclaimer, the term of this patent is extended or adjusted under 35 U.S.C. 154(b) by 1063 days.

(21) Appl. No.: 10/166,761

(22) Filed: Jun. 12, 2002

(65) Prior Publication Data

US 2004/0213208 A1 Oct. 28, 2004

Related U.S. Application Data

(60) Provisional application No. 60/331,297, filed on Nov. 14, 2001.

(51) Int. Cl.
*H04B 7/00* (2006.01)
(52) U.S. Cl. ........................ 455/512; 455/509
(58) Field of Classification Search ............... None
See application file for complete search history.

(56) References Cited

U.S. PATENT DOCUMENTS 5,267,047 A * 11/1993 Argenta et al. ............. 358/400
5,574,977 A * 11/1996 Joseph et al. ............... 455/450
6,208,865 B1 * 3/2001 Veerasamy .................. 455/450

\* cited by examiner

*Primary Examiner*—Creighton Smith
(74) *Attorney, Agent, or Firm*—Mark M. Friedman

(57) ABSTRACT

A method of increasing traffic in a telecommunications network by motifying a user that an opportunity to complete a previously incomplete call exists. The method includes receiving connection requests directed towards the telecommunications network, identifying connection requests directed towards a specific subscriber, compiling a list of incomplete connection and storing the list in a database, determining that the opportunity to complete the connection exists, and notifying the user that the opportunity exists. Further disclosed is a system for increasing traffic in a telecommunications network by notifying a user that an opportunity to complete a previously incomplete call exists, the system comprising a connection request monitor to compile and store a list of incomplete connection and identify a subset of requests directed towards a specific subscriber, an opportunity determination mechanism for ascertaining that the opportunity to complete the connection exists and a notification device for transmitting a notice to the user. Further disclosed is an improved method for determining availability of a specific mobile phase handset in a telecommunications network by monitoring a signaling trafficat least one signaling link between a cellular switch and a radio access.

17 Claims, 2 Drawing Sheets

METHOD AND SYSTEM OF INCREASING TRAFFIC IN A TELECOMMUNICATIONS NETWORK

This application claims priority from U.S. Provisional application 60/331,297 filed on 14 Nov. 2001.

FIELD AND BACKGROUND OF THE INVENTION

The present invention relates to a method and system of increasing traffic in a telecommunications network and, more particularly, to a method and system of notifying users of an opportunity to complete a previously incomplete communications connection.

Traditionally, telephone subscriptions were sold based upon a fixed fee which was not dependent upon the number of calls placed or the length of time a connection was established. With the introduction of service between calling zones (i.e. long distance, intercity, and international) billing by time increments for an established connection became common practice. Mobile or cellular telephone service providers have adopted a similar billing approach.

With the number of conventional telephones in many major markets near saturation, and the number of cellular phones subscribers in many markets not far behind, telecommunications service providers are looking for new ways to increase revenues without raising rates for service. Because billing is typically only for calls in which a connection is established, increasing the number of completed calls is the best way to generate increased revenue.

Answering machines and voice-mail offer one means of completing a call when a called subscriber is unavailable, but many callers are reticent to use these systems, so that some calls remain uncompleted.

Caller ID provides a passive solution which does not require participation by the calling party. However, it requires installation of special hardware at each recipient subscriber location. Many subscribers choose not to install such hardware because of the cost. Further, calls which originate with one service provider and are directed to a subscriber of a second service provider are sometimes received without caller ID information. If intermediate service providers are used in routing the call (e.g. in establishing an international connection), the likelihood that this will occur increases.

Because of the relatively high cost of mobile telephone service (e.g. satellite or cellular phone service), the greatest incentive for increasing traffic in a telecommunications network exists if the calling party, or the called party, or both are mobile phone subscribers.

U.S. Pat. No. 5,930,701 to Skog teaches methods for transmitting a caller identification number to a called party mobile station within a mobile telecommunications network. However, the teachings of Skog require use of GSM technology elements (e.g. MSC or MAP). This means that those teachings may not be applied to non-GSM telecommunications networks.

Further, Skog specifically teaches the use of an HLR which is normally a rate-limiting component in a cellular telecommunications network. Thus, implementation of the teachings of Skog must necessarily result in a backlog of caller identification numbers at the HLR with the size of the backlog being proportional to the number of incomplete calls.

Further, the teachings of Skog are limited to cases in which calls are missed because a subscriber handset is unreachable. Handling of calls which are incomplete for other reasons is not taught by Skog. Thus calls which are incomplete because the subscriber is busy in a data session or the subscriber didn't answer or allowed voice mail to answer but received no message in the mailbox do not benefit from the teachings of Skog.

There is thus a widely recognized need for, and it would be highly advantageous to have, a method and system of increasing traffic in a telecommunications network devoid of the above limitations.

SUMMARY OF THE INVENTION

According to one aspect of the present invention there is provided a method of increasing traffic in a telecommunications network. Traffic is increased by notifying a user that an opportunity to complete a previously incomplete call exists. The method includes: (a) receiving connection requests directed towards the telecommunications network; (b) identifying a subset of the connection requests directed towards a specific subscriber to the telecommunications network; (c) compiling a list of incomplete connection requests from within the subset and storing the list in a database; (d) determining that the opportunity to complete the connection exists; and (e) notifying the user that the opportunity to complete the connection exists.

According to another aspect of the present invention there is provided a system for increasing traffic in a telecommunications network. According to the system, traffic is increased by notifying a user that an opportunity to complete a previously incomplete call exists. The system includes: (a) a connection request monitor designed and configured to identify a subset of connection requests directed towards a specific subscriber and compile and store a list of incomplete connection requests from within the subset in a database; (b) an opportunity determination mechanism capable of ascertaining that the opportunity to complete the connection exists; (c) a notification device capable of transmitting a notice to the user that the opportunity to complete the connection exists, the notification device capable of receiving data from the database and the opportunity determination mechanism.

According to another additional aspect of the present invention, there is provided a method for determining availability of a specific mobile phone handset in a telecommunications network. The method includes monitoring signaling traffic at least one signaling link between a cellular switch and a radio access.

According to still further features in the described preferred embodiments, the at least one signaling link is a link between a bsc and an msc.

According to still further features in the described preferred embodiments notifying refers to at least one action selected from the group consisting of: (i) notifying a calling party of an opportunity to complete one of the incomplete connection requests; and (ii) notifying a called party of the incomplete connection requests.

According to still further features in the described preferred embodiments determining that the opportunity to complete the connection exists includes determining that a mobile handset belonging to the specific subscriber is available to receive an incoming connection request.

According to still further features in the described preferred embodiments the method further includes determining that no comparable connection request has been completed prior to notifying.

According to still further features in the described preferred embodiments the receiving of connection requests is accomplished by monitoring at least one signaling link between a Public Switched Telephone Network (PSTN) and a cellular network.

According to still further features in the described preferred embodiments the identifying a subset of the connection requests directed towards a specific subscriber includes monitoring at least one signaling link between a cellular switch (MSC) and a radio access (bst and bsc).

According to still further features in the described preferred embodiments the method further includes determining that the mobile handset has updated its location by monitoring a signaling link which connects a cellular switch and radio access.

According to still further features in the described preferred embodiments notifying the user that the opportunity to complete the connection exists includes notification to the calling party that a handset belonging to the called party has become available.

According to still further features in the described preferred embodiments the method further includes identifying a terminal capability of a party making a connection request and determining, based upon the network type, at least one suitable notification format for the notifying.

According to still further features in the described preferred embodiments the notice refers to at least one item selected from the group consisting of: (i) a notice to a calling party of an opportunity to complete one of the incomplete connection requests; and (ii) a notice to a called party that an incoming connection request from the calling party exists.

According to still further features in the described preferred embodiments the connection request monitor monitors at least one signaling link between a cellular switch and a radio access.

According to still further features in the described preferred embodiments the system further includes a connection request analyzer operating in conjunction with the connection request monitor. The connection request analyzer is designed and configured to: (i) identify a terminal capability of a party making a connection request; (ii) determine at least one suitable notification format for the terminal capability; and (iii) associate the suitable notification format with the connection request and store the notification format in the database.

The present invention successfully addresses the shortcomings of the presently known configurations by providing a method and system of increasing traffic in a telecommunications network by notifying users of an opportunity to complete a previously incomplete communications connection.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
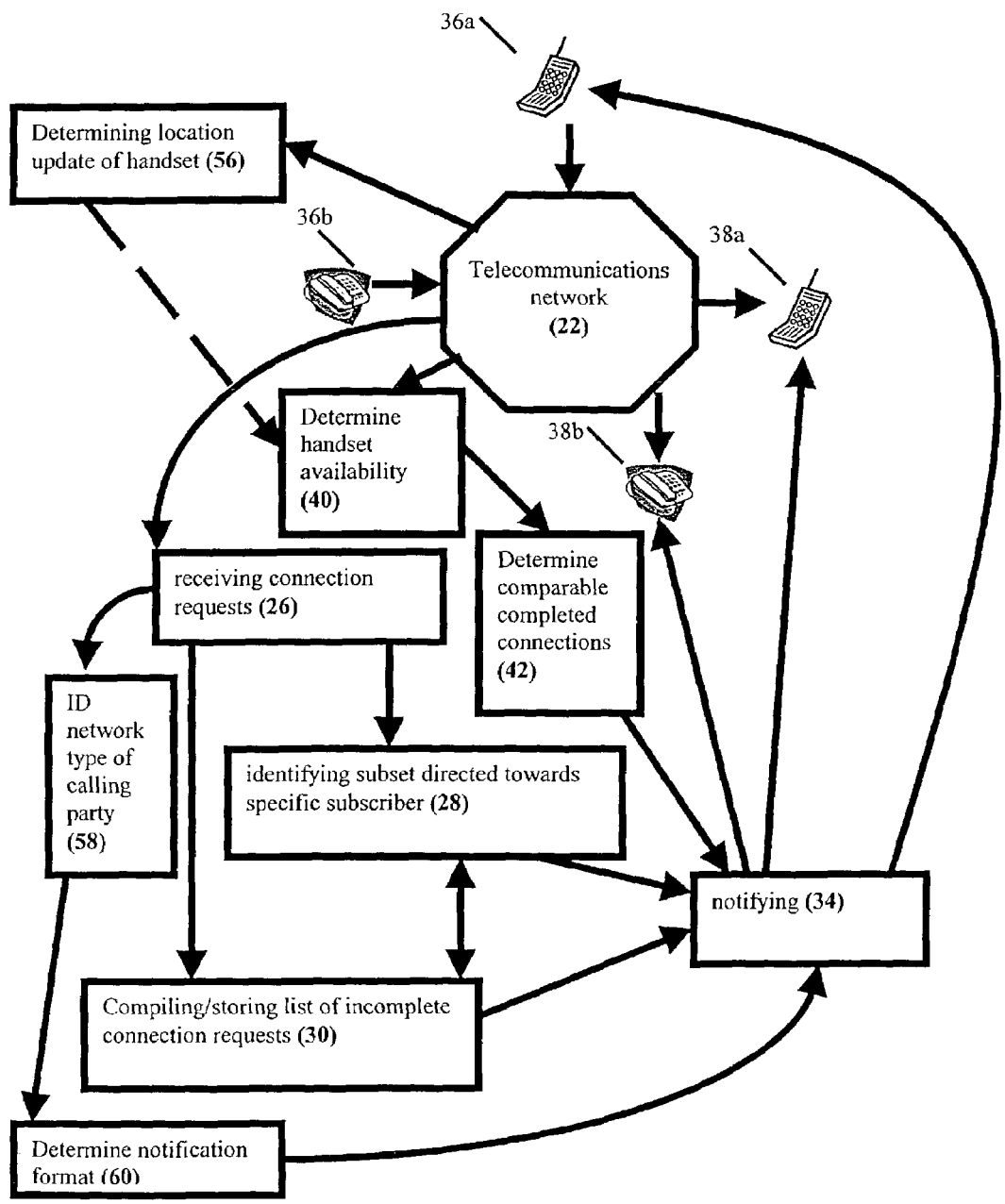
FIG. 1 is a simplified flow diagram illustrating methods according to the present invention.

The present invention is of a method and system which can be employed to increase communications traffic in a telecommunications network.

Specifically, the present invention can be used to notify users of an opportunity to complete a previously incomplete communications connection. Notification of opportunity encourages additional efforts to complete the connection, thereby increasing communications traffic.

The principles and operation of a method and system according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
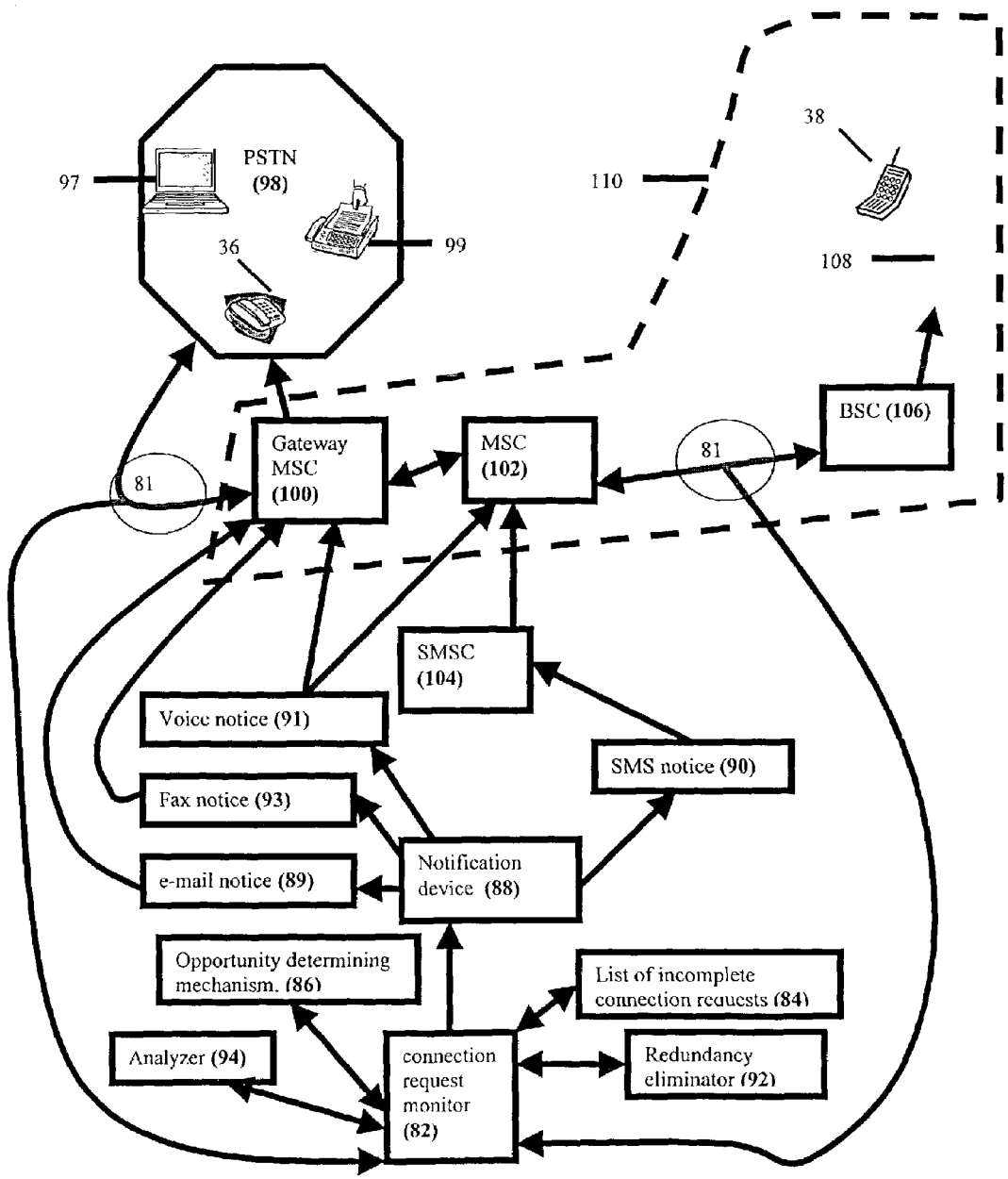
FIG. 2 is a schematic representation of components in a system according to the present invention.

Referring now to the drawings, FIG. 1 illustrates a method 20 of increasing traffic in a telecommunications network 22. Traffic is increased by notifying 34 a user (e.g. 36a or 38a or 38b) that an opportunity to complete a previously incomplete call exists. While only 4 users are depicted in FIG. 1, it will be appreciated that method 20 functions to greatest advantage in telecommunications networks 22 with larger numbers of users. As illustrated, notifying 34 may refer to notifying 34 a calling party (e.g. 36a) of an opportunity to complete one of the incomplete connection requests or notifying 34 a called party ( e.g. 38a or 38b) of an incomplete connection request. As illustrated in FIG. 2, notifying b34 is by notification device 88 which may produce an sms (small message service) message 90, fax transmission 93, e-mail message 89, or voice notice 91. Voice notice 91 may include, but is not limited to, a voice mail message, a voice message left on an answering machine or a phone call which provides a recipient with an IVR (interactive voice response) or keypad activated menu with option for completing a previously incomplete connection request. Alternately, or additionally, notifying 34 may include display of information on a user specific web page on a web site provided by a web server. Such a user specific web page may be, for example, password protected, to insure user privacy. Web pages are viewable upon a wide variety of user clients.

For purposes of this specification and the accompanying claims, the phrase "user client" generally refers to a computer and includes, but is not limited to, personal computers (PC) having an operating system such as DOS, Windows™, OS/2™ or Linux; Macintosh™, Palm OS™, EPOC™ computers; computers having JAVA™ -OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system; personal digital assistants (PDA), cellular telephones having computer capabilities, a telephone having computer capabilities and Web TVs, each of which is known to include an inherent or connectable display device.

For purposes of this specification and the accompanying claims, the term "Windows™" includes but is not limited to Windows 95™, Windows 2000™ Windows 3.x ™ in which "x" is an integer such as "1", Windows NT™, Windows 98™, Windows CE™ Windows ME™ and any upgraded versions of these operating systems by Microsoft Corp (U.S.A.) and/or window managers for the graphical X Windows system for UNIX based operating systems and/or its variants such as Linux.

For purposes of this specification and the accompanying claims, the phrase "Web page" refers to any document written in a "mark-up language", or "script language", or any programming language or tool. For purposes of this specification and the accompanying claims, the phrase "mark up language" includes, but is not limited to, HTML (hypertext mark-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Uniform Resource Locator). Script languages include, but are not limited to, CGI, PERL, VBScript, JavaScript and ASP.

For purposes of this specification and the accompanying claims, the phrase "display a Web page" includes all actions necessary to render at least a portion of the information on the Web page available to the computer user. As such, the phrase includes, but is not limited to, the static visual display of static textual or graphical information, the audible production of audio information, the animated visual display of animation and the visual display of video stream data.

For purposes of this specification and the accompanying claims, the term "Web site" refers to at least one Web page, and preferably a plurality of Web pages, virtually connected to form a coherent group.

For purposes of this specification and the accompanying claims, the term "Web server" or "server", unless otherwise indicated, refers to a server for providing one or more Web pages to a Web browser upon request. A single server may comprise an individual computing machine or a plurality of such machines acting in concert to perform a function requested by at least one other computing machine.

As depicted in FIG. 2, telecommunications network 22 preferably, but not necessarily, includes both a Public Switched Telephone Network (PSTN 98) and a mobile telephone network (e.g. cellular network 110). Method 20 includes receiving 26 connection requests directed towards the telecommunications network 22 and identifying 28 a subset of the connection requests directed towards a specific subscriber to the telecommunications network. Method 20 further includes compiling 30 a list of incomplete connection requests and storing the list in a database. Compiling 30 includes storing in a database a record of each call request wherein each stored record includes at least called party identification and calling party identification. Identification is typically by telephone number for purposes of system 80. However, according to preferred embodiments of the invention, notifying 34 includes sending additional identifying information such as the name of a person or company. This is achieved via the use of existing caller ID functions and computerized directory services and/or directories stored locally on a user client receiving the notice.

Preferably, this list is sorted by subsets 28. Method 20 further includes determining, for example by determining 40 handset availability, that the opportunity to complete the connection exists and notifying 34 a user (e.g. 36a, 38a or 38b) that the opportunity to complete the connection exists. Determination of handset availability may be performed by, for example, determining 56 location update of a handset.

According to some preferred embodiments of the invention, determining that the opportunity to complete the connection exists includes determining 40 that a mobile handset belonging to a specific subscriber is available to receive an incoming connection request. This may be accomplished, for example, by determining 56 that a handset has updated its location. Such a determination 56 is preferably made by monitoring all location update messages from handsets to the cellular switches at monitoring points 81. Most preferably, such monitoring is by means of a passive high impedance connection which does not interfere with normal flow of communications within mobile telephone network 110, or between network 110 and PSTN 98. Correlation with list 84 allows determination of intended recipient 38a had an incomplete connection request while they were not connected to network 110 as well as which calling parties (e.g. mobile phone 36a or PSTN telephone 36b placed those connection requests. As detailed hereinabove, notification 34 may be either to the calling party or the called party.

Preferably, method 20 further includes determining 42 that no comparable connection request has been completed prior to notifying 34. This process prevents redundant notification. As an illustrative non-limiting example, Bob 36b calls Jack 38a three times while Jack's has turned of his phone to take a nap. Jack 38a wakes up and immediately turns on his phone and calls Bob 36b. In this case, Bob's earlier attempts to reach Jack, stored in list 84, do not result in notifying 34 of an opportunity to either party. "Comparable connection requests", as used herein, refers to connections between the same pair of number which occur after an incomplete connection request has been listed in list 84 but before notification device 88 sends notice (e.g. 89, 90, 91 or 93)

Preferably, receiving 26 of connection requests is accomplished by monitoring at least one signaling link 81 between a Public Switched Telephone Network (PSTN) 98 and a cellular network 110. As described hereinabove, monitoring is preferably passive high impedance monitoring. According to various preferred embodiments of the invention, a variety of signals, including but not limited to, SS7, ISUP and TUP, IAM messages, IAI messages, Release, Release complete and disconnect signals may be monitored. Preferably cause fields in these messages are also monitored. The present invention is independent of communication protocol because it monitors data within the protocol. Preferably signaling link 81 is a connection point inherent in network 22, for example a testing. (XXX inventors, what is E1; T1)

Connection request monitor 82 is preferably a probe smt connected as wiretap device, for example an SMT passive high impedance monitoring probe (Septier Communications Ltd., Petach Tikva, Israel). Such probes are known in the art where they have previously been employed for network diagnostics/operational support and wiretap purposes. One of ordinarily skill in the art will be capable of employing a commercially available device for use in the context of the present invention.

According to additional preferred embodiments of the invention, the identifying 28 a subset of the connection requests directed towards a specific subscriber includes monitoring at least one signaling link 81 between a cellular switch (MSC) 102 and a radio access (bst 108 and bsc 106). In this case, monitoring refers to monitoring of signaling links such as, for example, SS7, frame relay, the presence or absence of BSSAP, BSSMAP, DTAP, LLC, or SNDCP. Especially useful in this context are A-interface for GSM technology, GB for GPRS technology, A1 for CDMA technology. Regardless of the specific network type, monitoring of all messages which are relevant to incoming calls, such as REL; RLC; Disconnect; Clear Request; Clear Command and Clear complete are preferably monitored.

According to additional preferred embodiments of the invention, method 20 further includes determining 56 that a mobile handset 38 has updated its location is effected by monitoring a signaling link 81 which connects a cellular switch 102 and radio access (e.g. 106 or 108). In this case, monitoring refers to monitoring of signaling links such as, for example, SS7, Frame relay, the presence or absence of BSSAP, BSSMAP, DTAP, LLC, or SNDCP. Especially useful in this context are A-interface for GSM technology, GB for GPRS technology, A1 for CDMA technology. Regardless of the specific network type, monitoring of all messages which are relevant to location update information such as layer 3 information, paging response, CM service requests, re-establish requests, IMSI detach; location update request; location update response; handover performed; handover request; handover complete; ADDS page; ADDS transfer; location update accept and location update reject. This embodiment of the invention is expected to find utility if mobile station 38 is roaming outside its home cellular network 110, for example if a subscriber travels to a different country.

According to an additional preferred embodiment of the invention, the reception 26 of incoming requests is accomplished by monitoring a signaling link 81 connecting the cellular network 110 with other networks, for example international networks. Preferably, this includes monitoring signaling links from the gateway MSC 100.

According some preferred embodiments of the invention, notifying 34 the user that the opportunity to complete the connection exists includes notification to the calling party (e.g. 36a) that a handset 38 belonging to the called party has become available. Availability may be interrupted, for example, because a cellular handset is out of broadcast range of network 110, is roaming in another network, is switched off, or is engaged in another call, especially a conference call which may block an incoming call from being routed to a voice-mail box. Conventional telephones 36 may be unavailable if they are engaged or temporarily disconnected or if another machine (e.g. fax or computer) is connected to the line.

According to preferred embodiments of method 20, a calling party 36 is directed to an automatic voice response system (IVR) which informs them that the called party is unavailable and offers the option of receiving a notice as described hereinabove. According to some embodiments of the invention, exercise of the option to receive a notice incurs a fee, billable to the calling party upon receipt of the notice.

Preferably, the calling party is given the option of selecting the method of receiving the notification, for example, by a voice conversation (IVR; to telephone 36 or cell phone 38), e-mail 89 to user client 97, fax 93 to fax machine 99, posting to a web page or an SMS message. If IVR is the selected format, when the IVR notifies calling party 36 of the renewed availability of called party 38, the IVR offers the option of automatically connecting the calling party 36 to called party 38.

According additional preferred embodiments of method 20, receiving connection request 26 includes determining 58 a terminal capability of a party making a connection request and determining 60, based upon the network type, at least one suitable notification format for notifying 34. Each connection request carries information which identifies the network from which it originated (i.e. telephone number) as well as identifying characteristics of the handset used to place the call (e.g. manufacturer; model and specific phone number) in the form of a timsi signal. Thus, connection request monitor 82 receives sufficient information to determine whether a calling party 36 is capable of receiving specific types of notifications. Thus, for example, monitor 82 is capable of identifying cellular subscribers as capable of receiving SMS messages 90, and PSTN subscribers as not capable of receiving SMS messages 90. System 80 therefore only provides notification options relevant to a specific calling party 36. For example, the option to receive notification by SMS 90 or voice to calling parties 36 identified as cellular subscribers, and the options of voice notification 91, fax 93 or e-mail 89 for PSTN subscribers.

The present invention is further embodied by a system 80 (FIG. 2) for increasing traffic in a telecommunications network 22. System 80 increases traffic by notifying a user that an opportunity to complete a previously incomplete call exists. System 80 includes a connection request monitor 82 designed and configured to identify 28 a subset of connection requests directed towards a specific subscriber and compile and store 30 a list 84 of incomplete connection requests from within subset 28 in a database. System 80 further includes an opportunity determination mechanism 86 capable of ascertaining that the opportunity to complete the connection exists. Mechanism 86 may, for example, determine handset availability as described hereinabove. System 80 further includes a notification device 88 capable of transmitting a notice to the user that the opportunity to complete the connection exists. Notification device 88 is capable of receiving data from database 84 and opportunity determination mechanismb86. This data reception may be, for example, via connection request monitor 82 as pictured. It will be appreciated that, because system 80 is electronic and computerized, various system components which are separately numbered in FIG. 2 may be integrated together into a physical unit with multiple capabilities. For example, components 82, 86, 88, 84 and 92 may all reside together in a single computer designed and configured to execute method 20 as described hereinabove.

According to various preferred embodiments, the notice may refer to a notice to a calling party (e.g. 36a or 36b) of an opportunity to complete one of the incomplete connection requests or a notice to a called party (e.g. 38a or 38b) that an incoming connection request from calling party 36 exists or both. As described hereinabove, notification may be in a variety of formats, the suitability of which is determined (58 and 60) by connection request monitor 82.

According to some preferred embodiments of system 80, connection request monitor 82 monitors at least one signaling link 81 between a cellular switch 102 and a radio access (e.g. 106 or 108) as described hereinabove.

Preferably, system 80 further includes a connection request analyzer 94 operating in conjunction with connection request monitor 82. Analyzer 94 is designed and configured to identify 58 a terminal capability of a party making a connection request. Analyzer 94 is further capable of determining at least one suitable notification format for the identified terminal capability and associating the suitable notification format with the connection request and storing the notification format in list 84.

For purposes of this specification and the accompanying claims, the phrase "terminal capability" includes, but is not limited to language, display size, capacity to receive sms, capacity to receive e-mail, capacity to receive fax and WAP capabilities.

The present invention is further embodied by a method for determining 40 availability of a specific mobile phone handset 38 in a telecommunications network 110. The method includes monitoring signaling traffic at least one signaling link 81 between a cellular switch 102 and a radio access 106, for example, a signaling link 81 between a bsc 106 and an msc 102. Availability may be renewed, for example, if a user turns on a mobile handset 38 or if a user re-establishes radio contact 108 with a cellular network 110 after contact was lost due to, for example, terrain or weather. Preferably, the Location update message is monitored (piggyback DTAP message at BSSMAP complete layer 3 message at SCCP connection request message at MSU message of SS7 protocol). Alternately, but also preferably paging responses, CM service requests, re-establish requests, location update requests or ADDS pages may be monitored.

The following narrative is presented as a non-limiting example of the utility of the present invention. Mr. Jones is a loan officer at Biggie Bank. He has received a request from Ms. Grey for a business loan of 2.5 million dollars to expand operation of her business on the west coast. Mr. Jones, from his office phone 36 attempts to call Ms. Grey on her cell phone 38 to notify her that the loan has been approved.

Ms. Grey has switched off her phone 38 as she boards an airplane to Los Angeles. Mr. Jones is not offered the option of leaving a voice mail message because Ms. Grey was roaming outside of her home network 110 prior to switching off her phone. However, according to the present invention, Mr. Jones call is directed to an IVR menu which offers him the option of being notified when Ms. Grey's telephone becomes available. Because system 80 is operated by Ms. Grey's Cellular Service Provider in this case, Mr. Jones is informed that receipt of the notice will incur a fee of 63 cents. Mr. Jones agrees. Analyzer 94 connected to request monitor 82 determines that Mr. Jones request originates from the PSTN 98. System 80 therefore offers him a choice of voice notice 91, fax notice 93, or e-mail notice 89. Mr. Jones chooses voice notice 91.

Ms. Grey lands in Los Angeles, debarks from the plane and turns on her phone. The cellular service provider in Los Angeles determines 56 the new location of her handset and further determines that the handset is available 40. This information is relayed to request monitor 82 via opportunity determining mechanism 86. Ms. Grey's phone number is compared to list 84 and an incomplete connection request from Mr. Jones is discovered. Concurrently, an IVR voice notice 91 to Mr. Jones telephone 36 is placed and an SMS message is sent to Ms Grey's cell phone 38 in California.

As she sits down in a taxi, Ms. Grey receives an sms message "At 11:17 EST you missed a call from 212-555-9687 (Biggie Bank)".

At about the same time, Mr. Jones receives an IVR call informing him that 212-555-1490 belonging to A. Grey is available. He is invited to automatically place the call by pressing # on his keypad. He does so and is connected to Ms. Grey.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of increasing traffic in a telecommunications network by notifying a user that an opportunity to complete a previously incomplete call exists, the method comprising:
    (a) receiving connection requests directed towards the telecommunications network;
    (b) identifying a subset of said connection requests directed towards a specific subscriber to the telecommunications network;
    (c) compiling a list of incomplete connection requests from within said subset and storing said list in a database;
    (d) determining that the opportunity to complete the connection exists; and
    (e) notifying the user that the opportunity to complete the connection exists.

2. The method of claim 1, wherein notifying refers to at least one action selected from the group consisting of:
    (i) notifying a calling party of an opportunity to complete one of said incomplete connection requests; and
    (ii) notifying a called party of said incomplete connection requests.

3. The method of claim 1, wherein determining that the opportunity to complete the connection exists includes determining that a mobile handset belonging to said specific subscriber is available to receive an incoming connection request.

4. The method of claim 1, further comprising determining that no comparable connection request has been completed prior to notifying.

5. The method of claim 1, wherein said receiving of connection requests is accomplished by monitoring at least one signaling link between a Public Switched Telephone Network (PSTN) and a cellular network.

6. The method of claim 1, wherein said identifying a subset of said connection requests directed towards a specific subscriber includes monitoring at least one signaling link between a cellular switch (MSC) and a radio access (bst or bsc).

7. The method of claim 3, further including determining that said mobile handset has updated its location by monitoring a signaling link which connects a cellular switch and radio access.

8. The method of claim 1, wherein said notifying the user that the opportunity to complete the connection exists includes notification to the calling party that a handset belonging to the called party has become available.

9. The method of claim 1, further comprising identifying a terminal capability of a party making a connection request and determining, based upon said network type, at least one suitable notification format for said notifying.

10. A system for increasing traffic in a telecommunications network by notifying a user that an opportunity to complete a previously incomplete call exists, the system comprising:
(a) a connection request monitor designed and configured to identify a subset of connection requests directed towards a specific subscriber and compile and store a list of incomplete connection requests from within said subset in a database;
(b) an opportunity determination mechanism capable of ascertaining that the opportunity to complete the connection exists;
(c) a notification device capable of transmitting a notice to the user that the opportunity to complete the connection exists, said notification device capable of receiving data from said database and said opportunity determination mechanism.

11. The system of claim 10, wherein said notice refers to at least one item selected from the group consisting of:
(i) a notice to a calling party of an opportunity to complete one of said incomplete connection requests; and
(ii) a notice to a called party that an incoming connection request from said calling party exists.

12. The system of claim 10, wherein opportunity determination mechanism is designed and configured to ascertain that a mobile handset belonging to said specific subscriber is available to receive an incoming connection request.

13. The system of claim 10, further comprising a redundancy eliminator capable of determining that no comparable connection request has been completed prior operation of said notifying device.

14. The system of claim 10, wherein said connection request monitor monitors at least one signaling link between a Public Switched Telephone Network (PSTN) and a cellular network.

15. The system of claim 10, wherein said connection request monitor monitors at least one signaling link between a cellular switch and a radio access.

16. The system of claim 10, wherein said opportunity determining mechanism is capable of determining that said mobile handset has updated its location by monitoring a signaling link which connects a cellular switch and radio access.

17. The system of claim 10, further comprising:
(e) a connection request analyzer operating in conjunction with said connection request monitor, said connection request analyzer designed and configured to:
(i) identify a terminal capability of a party making a connection request;
(ii) determine at least one suitable notification format for said terminal capability; and
(iii) associate said suitable notification format with said connection request and store said notification format in said database.

* * * * *